United States Patent
Povilaitis et al.

[15] 3,641,613
[45] Feb. 15, 1972

[54] VEHICULAR HEADLAMP CLEANER

[72] Inventors: Frank R. Povilaitis, Detroit; Carmon R. Strobel, Washington, both of Mich.

[73] Assignee: Chrysler Corporation, Highland Park, Mich.

[22] Filed: Dec. 4, 1969

[21] Appl. No.: 882,239

[52] U.S. Cl. ................................15/250.02, 15/250.3, 318/443
[51] Int. Cl. .................................................B60s 1/46
[58] Field of Search ....................15/250.01, 250.02, 250.12, 15/250.16, 250.17, 250.3; 307/132 T; 318/443, DIG. 2; 240/7.1 H

[56] References Cited

UNITED STATES PATENTS

| | | | |
|---|---|---|---|
| 3,058,142 | 10/1962 | Pollock | 15/250.02 |
| 3,456,278 | 7/1969 | Mandy et al. | 15/250.02 |
| 3,493,804 | 2/1970 | Fennell | 15/250.01 |
| 3,522,422 | 8/1970 | Dukatz et al. | 240/7.1 H |

FOREIGN PATENTS OR APPLICATIONS

| | | | |
|---|---|---|---|
| 230,220 | 3/1925 | Great Britain | 15/250.12 |
| 1,075,737 | 7/1967 | Great Britain | 15/250.02 |

*Primary Examiner*—Peter Feldman
*Attorney*—Harness, Talburtt and Baldwin

[57] ABSTRACT

A vehicle headlamp cleaner comprising a brush pivotally mounted adjacent each headlamp on a shaft which is driven by a vacuum actuator. The vacuum actuator is controlled by an electrical circuit including a vacuum solenoid switch and a flasher switch with the flasher switch cycling to intermittently energize the solenoid switch and intermittently connect the vacuum actuator with engine vacuum to pivot the brush through a cleaning stroke in which it scrubbingly engages the headlamp lens. The return stroke of the brush is accomplished by the return spring of the vacuum actuator upon deenergization of the solenoid switch by the flasher switch. A nozzle is also disclosed which is mounted on the brush and directs a stream of washer fluid onto the bristles of the brush as the brush is moving over the headlamp lens so that the bristles function to distribute the washer fluid over the entire brushed area of the lens.

3 Claims, 6 Drawing Figures

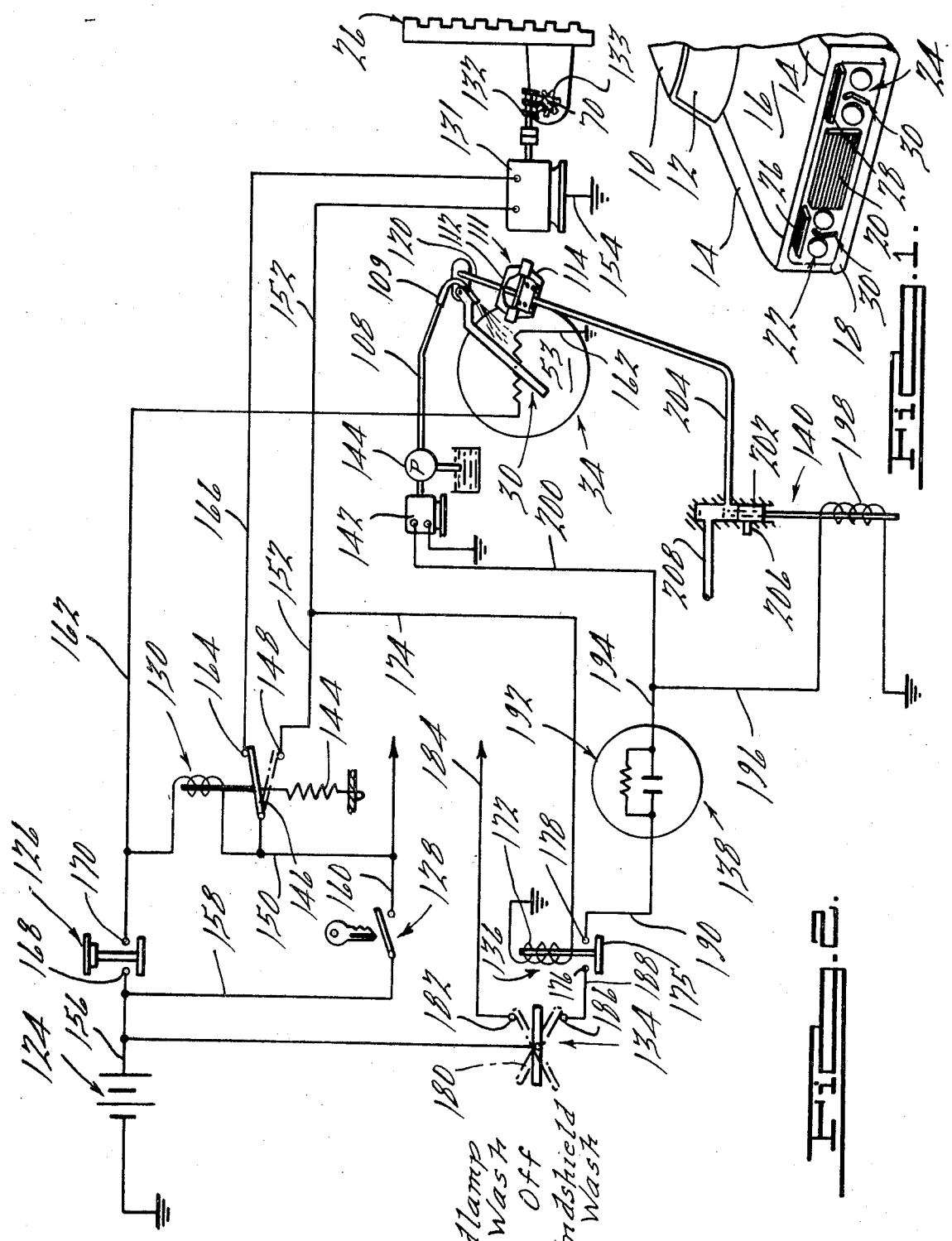

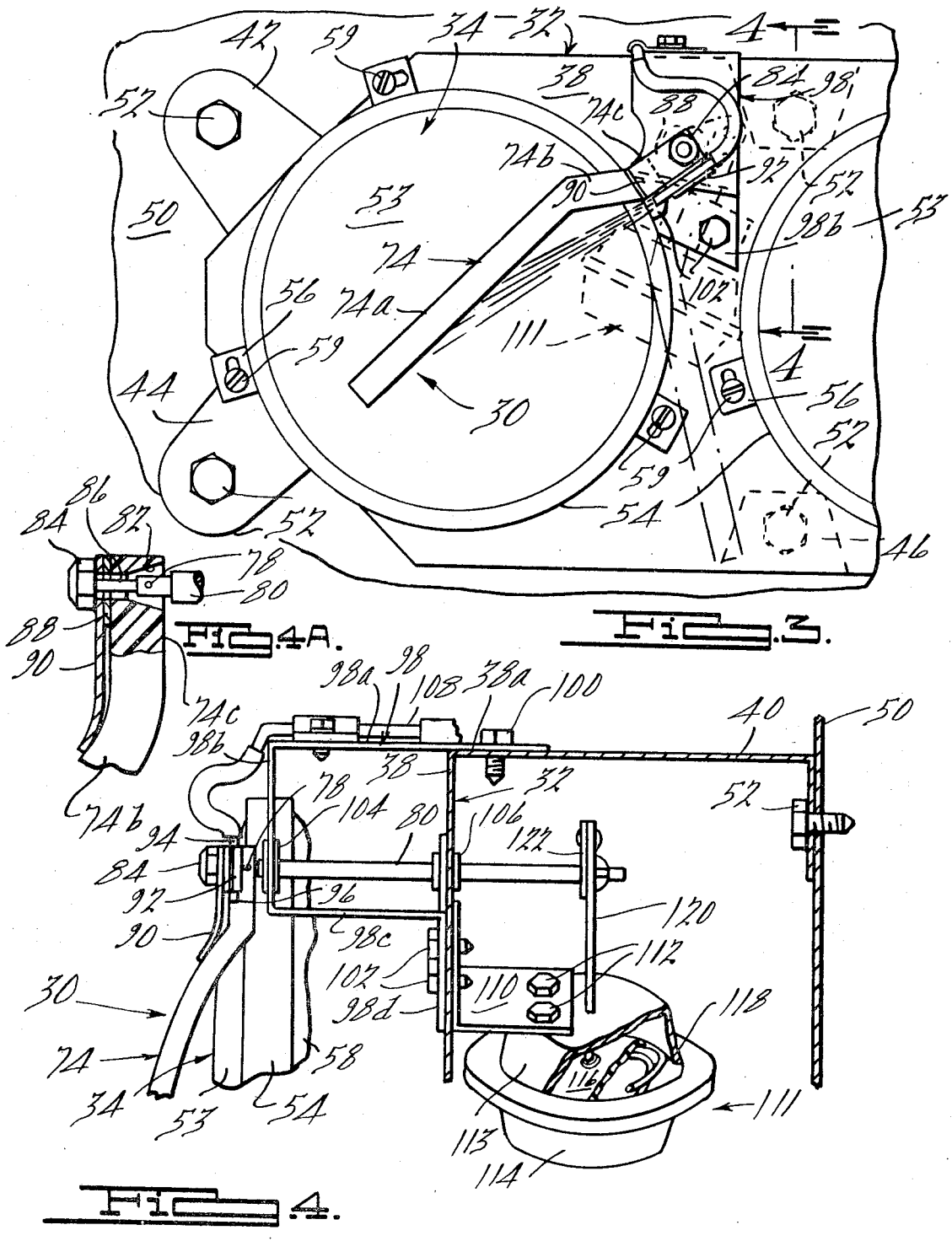

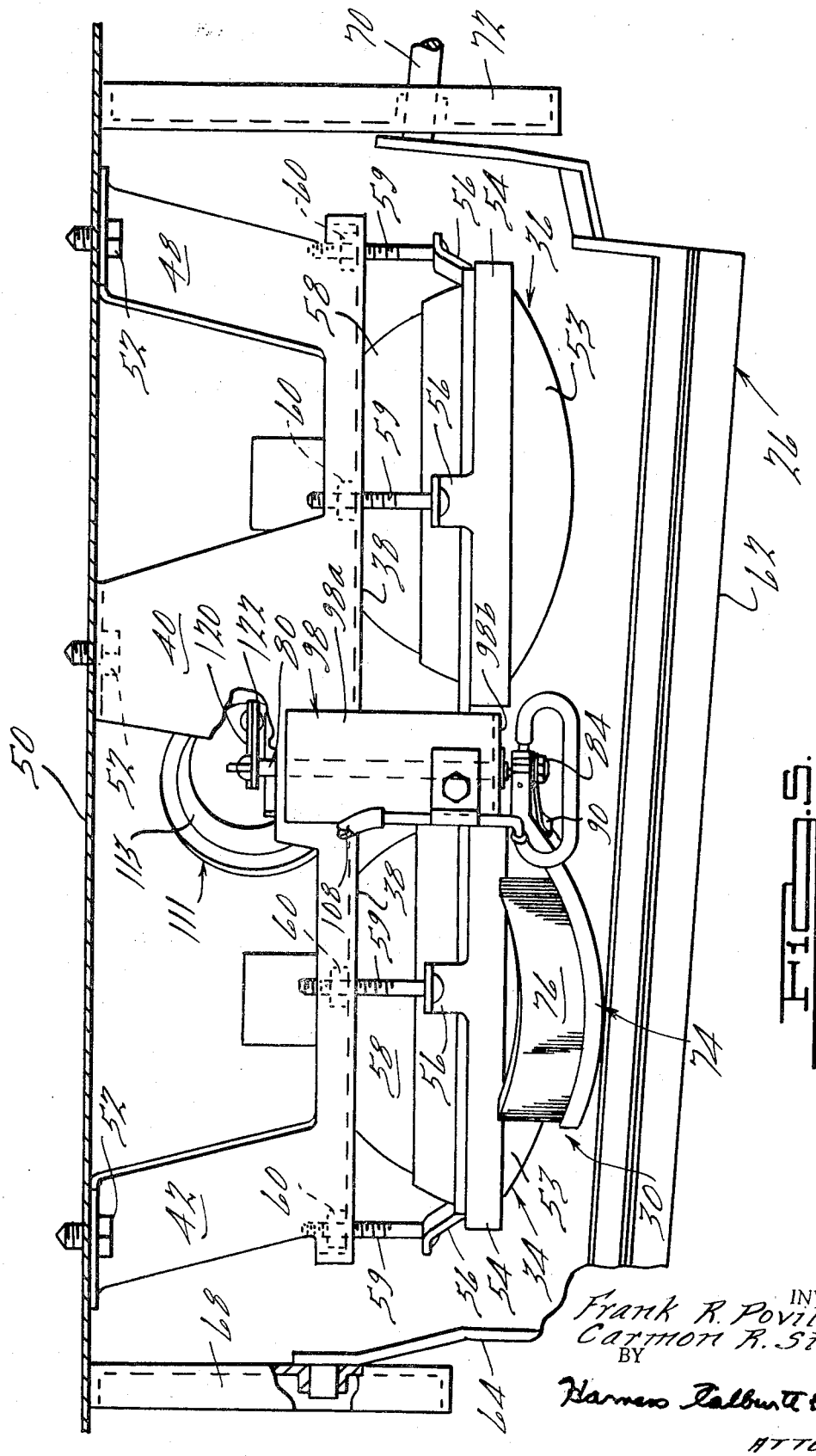

3,641,613

VEHICULAR HEADLAMP CLEANER

BACKGROUND OF INVENTION

This invention relates to vehicular headlamp cleaners. Various forms and types of vehicular headlamp cleaners have been proposed and/or made available; none of these known cleaners, however, is completely effective in removing other than superficial dirt from the headlamp lens.

SUMMARY OF INVENTION

The primary object of the present invention is to provide a vehicular headlamp cleaner which will effectively and reliably remove even encrusted dirt from the headlamp lens.

The invention headlamp cleaner comprises a brush mounted adjacent the headlamp to be cleaned for reciprocal movement through a first cleaning stroke passing over the lens of the lamp, and a return cleaning stroke; drive means are provided to move the brush through its first cleaning stroke and return means are provided which operate to move the brush through the return cleaning stroke. Control means are provided to control the movement of the brush and these control means include a control member positioned within the passenger compartment of the vehicle. The control means operate in response to movement of the control member to an On position to cyclically actuate and deactivate the brush drive means so that the brush is alternately moved through its first cleaning stroke by the drive means and thereafter moved through its return stroke by the return means to effect a cyclic, reciprocal cleaning movement of the brush on the lens.

The invention headlamp cleaner may further include a nozzle positioned against the headlamp and means for delivering washer fluid to the nozzle for delivery to the lens. The control means for the headlamp cleaner operate in response to movement of the control member to the On position to actuate the washer fluid delivery means during actuation of the brush drive means so that a stream of washer fluid is delivered to the lens as the brush moves through its first cleaning stroke over the lens.

The nozzle may be carried by the handle of the brush and carried to direct washer fluid against the bristles of the brush so that the brush functions to distribute the washer fluid over the entire brushed area of the lens.

In the disclosed embodiment, a vacuum actuator drives the brush and the vacuum actuator is controlled by a solenoid vacuum valve in an electrical circuit including a flasher switch. The flasher switch functions during operation of the cleaner to intermittently interrupt the supply of current to the solenoid vacuum valve and thereby intermittently interrupt the vacuum connection to the vacuum actuator; the brush is thus driven through its initial stroke by the vacuum actuator and thereafter allowed to move through its return stroke under the bias of the return spring of the vacuum actuator.

Other objects, features and advantages of the invention will be apparent from the detailed description of the preferred embodiment.

BRIEF DESCRIPTION OF DRAWINGS

A preferred embodiment of the invention is shown in the drawings in which

FIG. 1 is a fragmentary view of an automobile embodying the headlamp cleaner assembly of the invention;

FIG. 2 is a schematic view and circuit diagram of the invention headlamp cleaner assembly;

FIG. 3 is a fragmentary detail view of the right-hand headlamp assembly of the automobile of FIG. 1 showing the incorporation of the invention headlamp cleaner assembly;

FIG. 4 is a fragmentary sectional view taken on line 4—4 of FIG. 3;

FIG. 4A is a fragmentary detail view of a portion of FIG. 4; and

FIG. 5 is a top view of the headlamp assembly of FIG. 3.

DETAILED DESCRIPTION OF THE PREFERRED EMBODIMENT

The motor vehicle seen fragmentarily in FIG. 1 includes a roof 10, windshield 12, front quarter panel 14, hood 16, front bumper 18, grille 20, and right and left headlamp assemblies 22, 24. The vehicle of FIG. 1 is of a concealed headlamp design in which right and left headlamp doors 26, 28 are pivotally mounted between a closed position in which they form lateral extensions of grille 20 and shield the headlamp assemblies and the illustrated open position in which they are pivoted upwardly and rearwardly to a stored position above the headlamp assemblies to allow use of the headlamp assemblies for usual illumination. A brush 30 forming a portion of the invention headlamp cleaner assembly is seen positioned between the dual headlamps of each headlamp assembly.

The detailed manner in which the invention headlamp cleaner assembly is incorporated in the headlamp assemblies is seen in FIGS. 3, 4, 4A and 5 which represent various views of right headlamp assembly 22.

Assembly 22 includes the usual drive headlamp bracket 32 and sealed beam units 34, 36. Bracket 32 includes a main body plate portion 38 having two apertures (not seen) respectively accommodating the rear portions of sealed beam units 34, 36, and a plurality of integral mounting ears 40, 42, 44, 46 and 48 secured to the usual yoke plate 50 by screws 52.

Sealed beam unit 34 includes a lens 53, a rim 54 having a plurality of circumferentially spaced ears 56, and a reflector bowl 58. Unit 39 is adjustably positioned within the corresponding aperture in bracket plate portion 38 by a plurality of screws 59 engaging rim ears 54 and threading into nuts 60 rigidly secured to the rear face of plate portion 38. Unit 36 has substantially identical construction, and is mounted in substantially identical manner as unit 34.

Headlamp door 26 (FIG. 5) includes a main body grille portion 62 and pivot arm portions 64 and 66. Pivot arm portion 64 has a steel shaft journaled in a bracket 68 and pivot arm portion 66 is secured to a drive shaft 70 journaled in a bracket 72.

Brush 30 of headlamp assembly 22 comprises a plastic handle 74 and a plurality of individual bristles 76 imbedded in handle 74. Handle 74 includes a main body portion 74a carrying the bristles 76 and having a concave configuration corresponding to the corner configuration of lens 52, a dogleg portion 74b, and an upper portion 74c. Upper handle portion 74c is secured by a pin 78 to the forward end of a shaft 80 so that the handle moves with the shaft but may rotate relative to the shaft about the axis of pin 78 with such relative rotation being allowed by the oversize rearwardly facing cutout 82 (FIG. 4A) in the upper end of upper handle portion 74c. A nut 84 is threaded onto the free threaded end 86 of shaft 80 and clamps a bracket 88 and a spring finger 90 to the forward face of upper handle portion 74c. Spring finger 90 functions to continually bias the handle in a counterclockwise direction as viewed in FIG. 4A. Bracket 88 includes a rolled edge portion 92 which defines an arcuate groove to seat a metal tube 94. Tube 94 extends below bracket 88 and is pivoted and splayed at its lower end to define a nozzle 96 which is positioned (FIG. 3) to direct liquid spray onto bristles 76.

A bracket 98 is fastened to the central forward face of headlamp bracket plate portion 38. Bracket 98 includes an upper portion 98a secured at its rearward end by screw 100 to the upper flange 38a of the headlamp bracket plate portion, a front portion 98b, a lower portion 98c, and a flange portion 98d secured to the forward face of the headlamp bracket plate portion 38 by screws 102. Shaft 80 passes through a bushing 104 in brush bracket front portion 98b and thence through a bushing 106 in headlamp bracket plate portion 38; bushings 104 and 106 thus serve to journal shaft 80 for rotary movement about its lengthwise axis. A tube 108 is suitably clamped to the upper face of brush upper bracket portion 98a and a rubber hose 109 interconnects tubes 94 and 108 so that liquid supplied to tube 108 is delivered to nozzle 96.

Screws 102 also serve to secure an actuator bracket 110 to the rear face of the headlamp bracket plate portion and a vacuum actuator 111 of known form is secured to bracket 110 by screws 112.

Actuator 111 includes an upper housing portion 113, a lower housing portion 114, a diaphragm 116 clamped between the mating flanges of the upper and lower housing portions, a loaded coil spring 118 in the lower housing portion constantly urging diaphragm 116 upwardly, and an actuator rod 120 secured at its lower end to diaphragm 116 and extending upwardly through the top wall of the upper actuator housing for pivotal connection at its upper end to one end of a crank arm 122 which in turn is fixedly secured at its other end to the rear end of shaft 80 so that up and down movement of actuator rod 120 produces oscillatory movement of shaft 80 and brush 30.

The headlamp cleaner assembly incorporated in left headlamp assembly 24 is identical in construction and mounting to the assembly described above with reference to the right headlamp assembly.

The control system for the invention headlamp cleaner is seen in FIG. 2. In FIG. 2, 124 represents the vehicle battery, 126 is the usual headlamp switch, 128 is the ignition switch, 130 is a solenoid switch in the concealed headlamp circuitry, 131 is a reversible electric motor having an output worm gear 132 driving a pinion 133 on headlamp door drive shaft 20, 134 is a washer switch mounted on the vehicle instrument panel, 136 is a solenoid switch in the headlamp washer circuitry, 138 is a "flasher" type switch (which may, for example, be of the type available from Tungsol Electric Company of Newark, New Jersey as Part No. 3488269 or from Ideal Corporation of Brooklyn, New York as Part No. 3488268), 140 is a vacuum solenoid, 142 is an electric motor, and 144 is a constant displacement pump driven by motor 142.

OPERATION OF THE PREFERRED EMBODIMENT

Spring 144 of solenoid switch 130 normally maintains switch contact member 146 in a downwardly pivoted position in which member 146 engages lower contact 148 to complete a circuit from line 150, through member 146, through line 152 to motor 131 and through motor 131 to ground 154. When ignition switch 128 is closed, a circuit is completed from battery 124, through lines 156, 158, 160, 150 and 162 to headlamp unit 34 and thence to ground 162. This circuit energizes solenoid 130 and moves contact member 146 upwardly into engagement with upper contact 164 to complete a circuit to motor 131 through line 166 to energize motor 131 for rotation in a door-closing direction. Thus, if the headlamp doors are open when ignition switch 128 is closed, they will be immediately moved to a closed position; if they are already in a closed position, they will remain in that position. The current flowing to headlamp 34 at this line through line 162 is insufficient to illuminate the lamp. If headlamp switch 126 is now moved to an "on" position to close contacts 168, 170, the headlamps are illuminated and solenoid 130 is deenergized since power is now being supplied to both ends of the solenoid coil and no current flows in the coil. Switch member 146 is thus moved to the downwardly pivoted position under the urging of spring 144 to complete a circuit to motor 131 through line 152. Motor 131 is now energized for rotation in a door opening direction and the headlamp doors are accordingly moved to their open positions. Movement of switch member 146 to its downwardly pivoted position also completes a circuit to the coil 172 of washer solenoid 136 through lines 152 and 174. Solenoid 136 is thus energized to move solenoid switch member 175 upwardly into a position closing contacts 176, 178 and thereby condition the headlamp washer circuit for operation.

Washer switch 134 is a three-position member-type switch having a down position, "windshield wash," a center "off" position, and an up headlamp wash position. In the windshield wash position, switch member 180 engages upper contact 182 to complete a circuit through line 184 to a windshield washer motor and pump assembly (not shown) to direct a stream of washer fluid at windshield 12. When switch member 180 is moved to the headlamp wash position to engage contact 186, and assuming that solenoid 136 has been conditioned by turning on the ignition and the headlamps, a circuit is completed through line 188, contacts 176, 178, line 190, flasher switch 192, line 194, and line 196 to the coil 198 of vacuum solenoid switch 140. A parallel circuit is also completed through line 200 to motor 142. As coil 198 is energized, valve member 202 is moved downwardly from its upper, dotted line position, to its lower solid line position. In the upper position of valve member 202, vacuum actuator line 204 communicates through the vacuum valve with atmospheric vent 206; in the lower position of valve member 202, vacuum actuator line 204 communicates through the vacuum valve with engine vacuum line 208. Movement of valve member 202 to its lower solid line position in response to energization of coil 198 thus communicates the lower actuator housing 114 of actuator 111 with a vacuum source and causes diaphragm 116 to move downwardly under the influence of the atmospheric pressure in upper actuator housing 113; downward movement of diaphragm 116 moves rod 120 through a down stroke and rotates brush 30 from its parked positions between the sealed beam units of headlamp assembly 22 upwardly and outwardly to wipe the lens 53 of outward sealed beam unit 34. Simultaneously, washer fluid is delivered from pump 144 through washer tube 108, hose 109 and tube 94 to nozzle 96. Washer fluid is thus squirted in a continuous stream out of nozzle 96 and onto bristles 76 as brush 30 moves upwardly over the lens of unit 34 so that the washing action of the washer fluid is combined with the scrubbing action of the brush to remove even encrusted dirt from the lens. The brush acts as a carrier and spreader for the washer fluid and functions to distribute the washer fluid over substantially the entire wiper surface of the lens. Simultaneously with or soon after the arrival of the brush at the upper or top dead center position of its cycle, the resistance element in flasher switch 192 heats up sufficiently to open the flasher switch and break the circuits to the washer motor and the vacuum solenoid. Coil 198 is thus deenergized to return valve member 202 to its upper position in which it vents actuator housing 114 to atmosphere, and compressed actuator spring 118 inward to move rod 120 upwardly and return brush 30 to its down or parked position. No washer fluid is delivered to the brush during its downward movement since motor 142 is not operating at this time. Simultaneously, or soon after, the arrival of the brush in its parked position, the resistance element in flasher switch 192 cools to an extent to reclose the circuits through the flasher to the washer motor and vacuum actuator. The brush and washer assemblies will continue to cycle in the manner described until washer switch member 180 is moved to the Off position. It will be understood that, whereas the brush and washer operation has been described with reference to one headlamp assembly, the system functions in response to activation of switch member 180 to effect a cleansing operation at both headlamp assemblies, cleaning action in each case occurring on the lens of the outboard or "low beam" sealed beam unit.

Although a preferred embodiment of the invention has been illustrated and described in detail, it will be apparent that various changes and modifications may be made in the disclosed embodiment without departing from the scope or spirit of the invention.

We claim:

1. A headlamp cleaner assembly for a motor vehicle having a passenger compartment and at least one headlamp positioned adjacent each side of the front end of the vehicle, said assembly comprising
   A. a shaft adjacent each headlamp extending generally parallel to the lengthwise axis of the vehicle and journaled for rotary movement about its lengthwise axis;
   B. a brush for each headlamp, each brush including an elongate handle member;

C. means securing each handle member at one end thereof to a respective shaft adjacent the forward end thereof to mount each brush for reciprocal movement through an arcuate path passing over the lens of the respective headlamp;

D. a vacuum actuator for each shaft having a rod crankingly engaging that shaft adjacent the rearward end thereof to move said brush reciprocally through said path; and E. control means, including a control member positioned within said passenger compartment and having an Off position and an operating position, operative in response to movement of said control member to said operating position to continuously cycle said vacuum actuator and thereby continuously cycle said brush reciprocally through said arcuate path.

2. A headlamp cleaner assembly for a motor vehicle having a passenger compartment and at least one headlamp positioned adjacent each side of the front end of the vehicle, said assembly comprising A. a brush mounted adjacent each headlamp for reciprocal movement through a first cleaning stroke passing over the lens of that lamp and a return cleaning stroke;

B. a vacuum actuator operative to move said brush through said first cleaning stroke;

C. a spring operative to move said brush through said return cleaning stroke; and D. control means comprising an electrical circuit for actuating said vacuum actuator, said electrical circuit including a vacuum solenoid valve for controlling the supply of vacuum to said vacuum actuator and a flasher switch for periodically interrupting said circuit to periodically interrupt said actuation of said vacuum actuator and allow said spring to periodically return said brush through said return stroke, said control means further including a control member positioned within said passenger compartment which is operative to actuate and deactuate said control means.

3. A headlamp cleaner assembly for a motor vehicle having a passenger compartment and at least one headlamp positioned adjacent each side of the front end of the vehicle, said assembly comprising A. a brush mounted adjacent each headlamp for reciprocal movement through a first cleaning stroke passing over the lens of that lamp and a return cleaning stroke;

B. a nozzle positioned adjacent each headlamp;

C. an electrically driven pump for delivering washer fluid to said nozzles for delivery to said lenses;

D. a vacuum actuator operative to move said brush through said first cleaning stroke;

E. a spring operative to move said brush through said return cleaning stroke; and F. control means comprising an electrical circuit for actuating said vacuum actuator and said pump for delivering washer fluid during actuation of vacuum actuator whereby a stream of washer fluid is delivered to said lenses during movement of said brushers through said first cleaning stroke, said electrical circuit including a vacuum solenoid valve for controlling the supply of vacuum to said vacuum actuator and a flasher switch for periodically interrupting said electrical circuit to periodically interrupt said actuation of said vacuum actuator and said pump whereby said brushers are alternately moved through said first cleaning stroke with washer fluid being delivered to said lenses during such movement and thereafter moved through said return stroke with washer fluid delivery being terminated during such return movement, said control means further including a control member positioned within said passenger compartment which is operative to actuate or deactuate said control means.

* * * * *